C. B. MOREHOUSE.

Whip-Sockets.

No. 5,235. Reissued Jan. 14, 1873.

Witnesses.

C. D. Kellum

J. W. Alger

Inventor. Charles B. Morehouse

By Edwin Chamberlin

John O. Merriam

AM. PHOTO-LITHOGRAPHIC CO. N.Y. (OSBORNE'S PROCESS.)

UNITED STATES PATENT OFFICE.

CHARLES B. MOREHOUSE, OF NEWCASTLE, INDIANA, ASSIGNOR, BY MESNE ASSIGNMENTS, TO EDWIN CHAMBERLIN AND JOHN O. MERRIAM.

IMPROVEMENT IN WHIP-SOCKETS.

Specification forming part of Letters Patent No. 43,858, dated August 16, 1864; reissue No. 5,235, dated January 14, 1873.

*To all whom it may concern:*

Be it known that Letters Patent of the United States of America were duly granted and issued to CHARLES B. MOREHOUSE, of Newcastle, Henry county, Indiana, on the 16th day of August, 1864, upon Improvements in Whip-Socket Fastenings, which Letters Patent, by reason of a defective and insufficient specification, are wholly inoperative and invalid, and your petitioners beg leave to surrender the same and ask that new Letters Patent may be ordered to issue to them upon the following corrected and amended specification, reference being hereby had to the accompanying amended drawing which forms and makes a part of this specification, and in which said drawing like letters represent and refer to like or corresponding parts.

Figure 1:
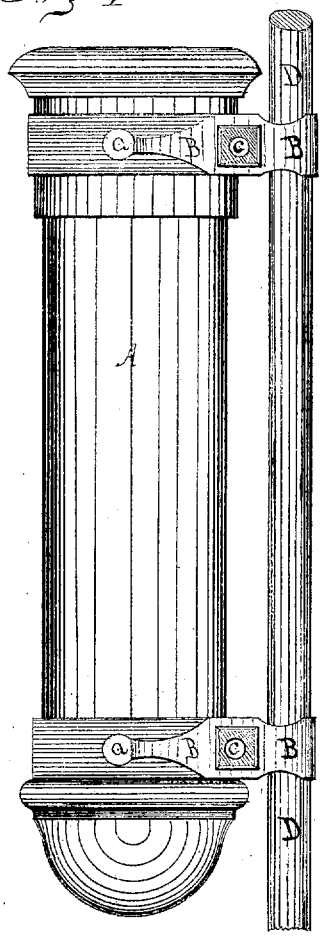
Figure 2:
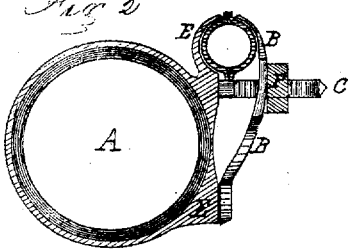

Figure 1 represents a dash-rail of a carriage or other vehicle, and a whip-socket attached thereto by means of the improved fastening hereinafter described. Fig. 2 is a cross-section through the whip-socket and dash-rail at the point where the two are connected by the improved fastening shown at Fig. 1, and more clearly showing the construction of said fastening device hereinafter described.

The nature of the invention consists in the employment of a suitably-shaped projection or jaw rigidly and permanently attached to a whip-socket, in combination with a loose or detachable cap or jaw, the two jaws being firmly united and made to form a clamp by means of a screw and nut, and the whole operating as a device for firmly clamping a whip-socket to the dash-rail of a carriage or other vehicle, substantially as hereinafter specified.

In the accompanying drawing, A represents an ordinary whip-socket. E, Fig. 2, shows the projection or jaw forming a part of the fastening device, which said jaw E may be of any suitable shape and is rigidly attached to the whip-socket A. B, Figs. 1 and 2, represents the loose screw-cap or jaw which forms the other part of the clamp.

When desired to attach a whip-socket to the dash-rail or other part of the carriage by means of the improved fastening device, the manner of operation is as follows: The jaw E is placed against the dash-rail D; the cap or jaw B is then placed over the dash-rail D, the rod C passing through the cap B, as shown at Fig. 2; the nut F is then screwed on the rod C until it firmly binds and clamps the two jaws or clasps E and B together, thereby securely clamping the dash-rail D and fastening the whip-socket A thereto, as shown at Fig. 1 of accompanying drawing. The rod C is securely fastened at one end to the whip-socket A, and has a thread cut upon the same for the purpose of screwing the nut F against the jaw B, thereby forming a clamp, a portion of which will be rigidly attached to the whip-socket A, and by means of which said whip-socket may be firmly attached to the dash-rail D, as hereinbefore described.

What is claimed as the invention, and desired to be secured by Letters Patent of the United States, is—

A clamp or fastening device consisting of the jaw E, in combination with the movable bar or cap B for the purpose of fastening a whip-socket to the dash-rod D or other suitable part of a vehicle.

In testimony whereof we have hereunto set our hands.

CHARLES B. MOREHOUSE.
By EDWIN CHAMBERLIN,
JOHN O. MERRIAM,
*Assignees.*

Witnesses:
J. W. ALGER,
C. D. KELLUM.